United States Patent [19]

Harshbarger, Jr. et al.

[11] Patent Number: 4,627,484

[45] Date of Patent: Dec. 9, 1986

[54] HEAT PUMP CONTROL SYSTEM WITH DEFROST CYCLE MONITORING

[75] Inventors: John H. Harshbarger, Jr.; John H. Harshbarger, III, both of Xenia, Ohio

[73] Assignee: Visual Information Institute, Inc., Xenia, Ohio

[21] Appl. No.: 569,258

[22] Filed: Jan. 9, 1984

[51] Int. Cl.$^4$ .................. F25B 13/00; F25B 29/00
[52] U.S. Cl. ........................... 165/2; 165/12; 165/29; 62/155; 62/234
[58] Field of Search ............. 62/234, 155, 156, 160; 165/29, 12, 17, 2

[56] References Cited

U.S. PATENT DOCUMENTS

| | | | |
|---|---|---|---|
| 3,273,635 | 9/1966 | Jobes | 165/29 |
| 4,102,389 | 7/1978 | Wills | 165/29 |
| 4,209,994 | 7/1980 | Mueller et al. | 62/155 |
| 4,211,089 | 7/1980 | Mueller | 62/160 |
| 4,211,207 | 7/1980 | Molivadas | 126/433 |
| 4,253,130 | 2/1981 | Newell | 62/324.1 |
| 4,262,530 | 4/1981 | Gerquest | 73/861.8 |
| 4,265,298 | 5/1981 | Sumner, Jr. | 165/29 |
| 4,265,299 | 5/1981 | Harnish | 165/29 |
| 4,269,261 | 5/1981 | Kountz | 165/29 |
| 4,289,272 | 9/1981 | Murase | 62/160 |
| 4,301,660 | 11/1981 | Mueller | 62/160 |
| 4,311,497 | 1/1982 | Newell | 62/160 |
| 4,328,680 | 5/1982 | Stamp, Jr. et al. | 62/234 |
| 4,333,316 | 6/1982 | Stamp, Jr. | 62/160 |
| 4,338,791 | 7/1982 | Stamp, Jr. | 165/29 |
| 4,346,755 | 8/1982 | Alley | 165/29 |
| 4,373,350 | 2/1983 | Noland | 165/29 |

FOREIGN PATENT DOCUMENTS 0061530 5/1981 Japan ........................... 62/234

Primary Examiner—Albert W. Davis, Jr.
Assistant Examiner—John K. Ford
Attorney, Agent, or Firm—Jeffers, Irish & Hoffman

[57] ABSTRACT

A control system for controlling a heating system having a heat pump and a source of supplemental heat. The control system monitors the defrost cycling of the heat pump, and when the heat pump is in its defrost cycle for more than a predetermined portion of a heating cycle, the heat pump will be shut down until the outdoor ambient temperature has risen by a predetermined amount or a given interval of time has elapsed. The heat pump is also shut down if the outside ambient temperature falls below a certain level and is automatically reenabled is the outside ambient exceeds a second level. The system results in more efficient operation of the heat pump/supplemental heat system by disabling the heat pump when weather conditions do not favor efficient heat pump operation.

28 Claims, 5 Drawing Figures

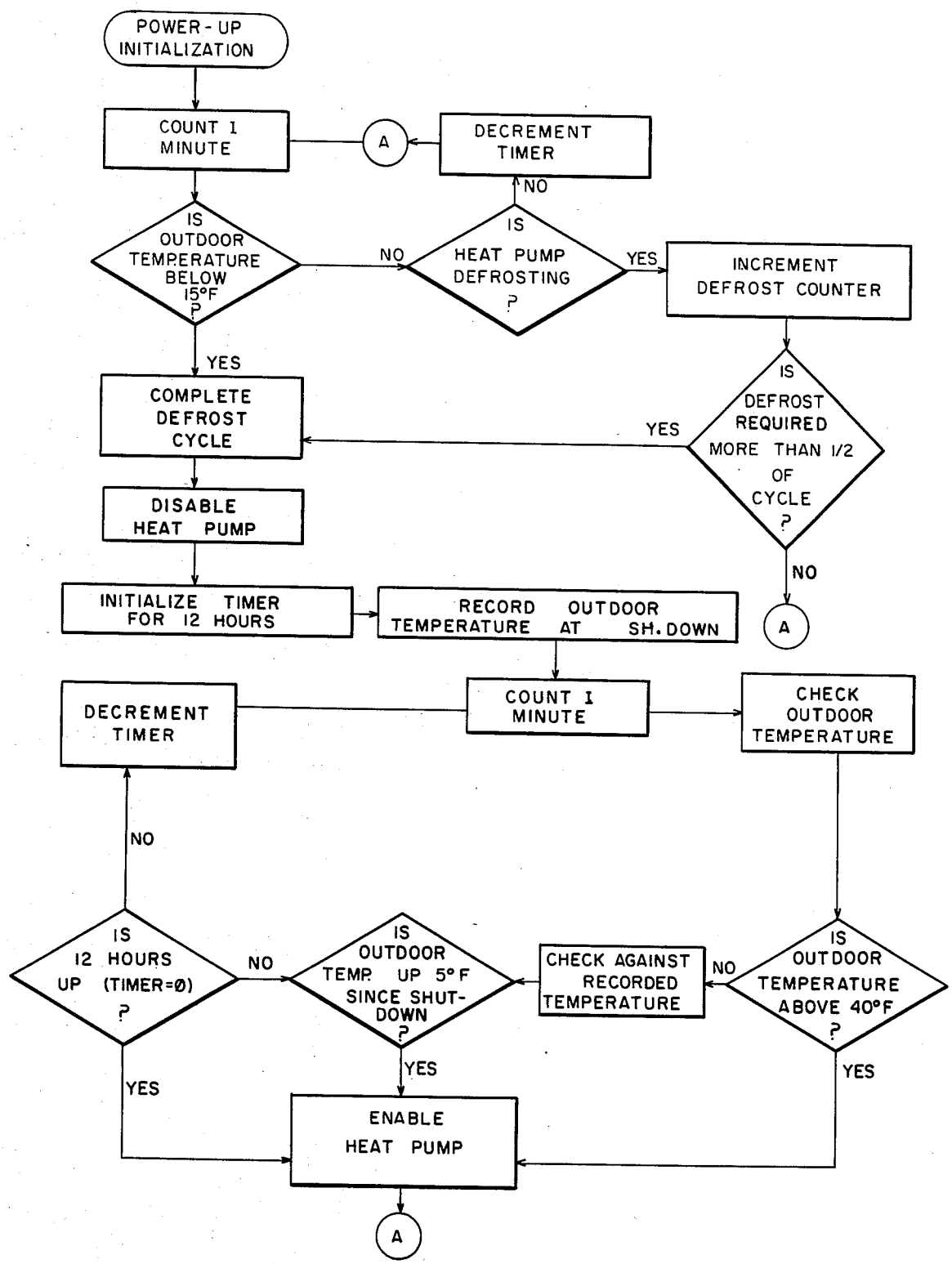

HEAT PUMP CONTROL SYSTEM WITH DEFROST CYCLE MONITORING

BACKGROUND OF THE INVENTION

The present invention relates to a heating system employing both a heat pump and a source of supplemental heat, such as a resistance heat furnace or a fossil fuel furnace, and relates in particular to a control system whereby greater efficiency in the utilization of the two heat sources is realized.

A heat pump utilizes a compressor and a refrigerant recirculation system including a condenser and evaporator to provide both cooling in the warmer seasons of the year and heating in the winter. When heating, the high temperature condenser is located in the interior space and the lower temperature evaporator is located outdoors to extract heat from the outside air and transfer it to the interior space through the condenser.

Since heat pumps utilize outside ambient air in contact with the evaporator as the heat source during the winter months, they operate efficiently only when the outside air temperature is above a certain level, such as 40°, for example. In regions of colder average winter temperatures, supplemental heat, such as is supplied by fossil fuel furnaces or resistive heat, is necessary in order to maintain the temperature within the building at the desired level. As the outside temperature drops, there is less heat available for transfer to the interior condenser, so that the system eventually reaches a point where the heat transfer is not adequate to satisfy the heat demand called for by the thermostat. Furthermore, as the outside ambient temperature drops, the efficiency of the heat pump suffers because of frost buildup on the evaporator coils, which occurs at a greater rate with a progressive decrease in the outside ambient temperature.

In the defrost cycle, the heat pump is run in the reverse direction to transfer heat from the warmer indoor condenser coil to the outside evaporator coil, thereby melting the frost. Following the defrost cycle, normal operation can be resumed, assuming that heat is called for by the thermostat. Of course, during the defrost cycle of the heat pump, heat is not being supplied to the building, and the supplemental heat must be relied on to maintain the desired ambient temperature. This requires that both the supplemental heat unit and the heat pump be operated simultaneously, the former to maintain the desired heat level within the building and the latter to eliminate the frost build-up so that the heat pump can return to normal operation.

Whenever the outside ambient is below that which permits adequate transfer of heat, both the heat pump and the supplemental heat source are operating simultaneously, with greater energy demand than with the heat pump operating alone or with the supplemental heat operating alone. When the heat pump and supplemental heat source are operating together beyond a certain portion of the heat cycle, there is greater energy consumption than if only the supplemental heat source alone is used for a given quantity of heat delivered. During the defrost cycle of the heat pump, energy is required to heat the outside evaporator coils, and supplemental heat may be necessary to maintain the desired inside temperature level called for by the thermostat. Accordingly, if frequent and lengthy defrost cycles are necessary to maintain the evaporator coils free of frost, less energy will be consumed by operating the supplemental heating alone and shutting down the heat pump entirely. This is true even though the heat pump operation is generally more efficient than supplemental heating, for example resistance or fossil fuel burning, depending on the outside temperature and humidity conditions. The buildup of frost on the evaporator coils is a function of the outside ambient temperature and also the dew point. If the dew point is high, moisture will condense on the evaporator coils and turn to frost at a higher temperature than if the dew point is lower.

As an example of the increased energy requirements for running the heat pump and supplemental heat source in tandem, consider a heating system utilizing a 15 kilowatt heat pump and a 30 kilowatt resistive heater. The heat cycle is one hour, and in this one hour period, the interior zone to be heated will demand heat input. The most efficient case exists when heat is required solely from the heat pump because maximum energy consumed is 15 kilowatt hours. However, should conditions require that the heat pump and resistive heater be run in tandem, their maximum energy consumption is 45 kilowatt hours, which is substantially less efficient than if only the resistive heater ran for the cycle consuming 30 kilowatt hours. Weather conditions can permit either the heat pump operating alone or operating in tandem with the resistive heater during the heat cycle.

Prior art control of heat pump operation is generally accomplished by means of an electromechanical thermostat mechanism, with separate temperature sensors for each state of heat pump system operation. Furthermore, there are defrost timers, relays, and pressure and temperature sensors utilized to control system defrost cycling, but since they are internal to the heat pump system, they are not readily available for immediate user control. Furthermore, the weather and condition of the heat pump system form a complex set of factors that are constantly changing, thereby making it very complex to determine the combination of heat pump and resistive heating which renders maximum efficiency. To maintain the heat pump system in the most efficient state would require the user to continually measure all of these factors and perform complex computations. Accordingly, prior art heat pump installations do not have the means available to the user to efficiently operate the heat pump systems in the lowest energy demand state while maintaining the temperature of the building at the desired level.

To summarize, the current problem with heat pump installations is that their advantage over other methods of heating exists only when the heat pump operates without supplemental heat. The more frequently that the heat pump operates with supplemental heat, either during its heating cycle when the outside ambient temperature is so low that the heat pump is not able to satisfy the heat demand, or during its defrost cycle, the less advantage there is in terms of energy efficiency over other heating plants, such as resistance or fossil fuel furnaces. This has resulted in heat pumps being used more often in regions where the outdoor temperatures are sufficiently high during the winter months that the need for supplemental heat is infrequent, such as in the Southern and Southwestern regions of North America. The use of heat pumps in cooler Northern climates, particularly in those climates where the air humidity is high during the winter months, requires very complex controls which, although perhaps they can be justified for large buildings, are not feasible for domestic and smaller commercial and industrial installations.

SUMMARY OF THE INVENTION

The invention, according to one form thereof, allows normal heat pump operation during weather requiring little or no supplemental heat. However, suspension of normal heat pump operation occurs when weather conditions require frequent defrost cycling or do not allow adequate transfer of heat from outdoor to indoor air. Under these conditions, heat is provided solely by the supplemental heat source, and energy otherwise utilized by the compressor/exchanger network is conserved. Normal operation is restored once favorable weather conditions return. Since during weather periods unfavorable to heat pump operation, the user has no greater advantage than users of normal supplemental heat sources, the supplemental heat source alone is relied upon. This still provides the user with the greater advantage of heat pump operation in favorable weather.

The heat pump system is controlled to minimize energy demand and overall energy consumption while still providing for the user's need for heat. This is accomplished by automatically placing the heat pump system in the lower energy demanding state that continues to provide the necessary heat output under existing weather conditions, whether it be heat pump operation alone, heat pump operation in tandem with occasional supplemental heat operation, or supplemental heat operation alone. The outdoor ambient temperature is measured and the prevalence of heat pump system defrosting is monitored. This data is compared with programmed limits for minimum operating outdoor temperature and maximum defrost cycling occurrence within a period of time, and if the limits are exceeded, the control overrides the normal heat pump control by shutting down the heat pump system. Under these conditions, supplemental heat alone is relied upon.

In one form of the invention, if the override control system detects that the heat pump is in its defrost cycle for more than 50% of a given heating cycle, the heat pump will be shut down and only supplemental heat will be utilized to heat the building, depending on the demand for heat as sensed by the thermostat. Additionally, the outdoor ambient temperature is monitored, and if the temperature falls below 15° F., the heat pump will automatically be disabled because of the inability of the heat pump to transfer a sufficient amount of heat to the interior space to be heated. If the outside ambient temperature is above 40°, then heat pump operation will again be reenabled so that when its thermostat calls for heat, it will operate in the normal mode. Of course, the 10° F. shutdown temperature and 40° F. restore temperature may be varied depending on the type of heat pump, weather conditions, and the like.

Once the heat pump has been disabled, and if the outdoor temperature is below 40° F. but above 15° F., the heat pump will again be enabled when the outdoor temperature sensed by the external temperature sensor is a predetermined amount higher than the outside ambient temperature at heat pump shutdown, for example, 5° F. higher. Also, if twelve hours have elapsed since the last shutdown of the heat pump, and the outside ambient temperature is higher than 15° F., the heat pump will again be enabled to run through a single heating cycle. If, during the heating cycle, the heat pump is still in its defrost mode for more than half of the time, then the heat pump will again be disabled and the twelve hour timing period initiated.

In a preferred embodiment of the invention, a microcomputer is utilized to perform the calculations and store the appropriate data to cause the control system to operate. The microcomputer repeatedly interrogates the defrost circuitry of the heat pump, and increments or decrements a counter in the microcomputer depending on whether or not the heat pump is in its defrost mode. If the heat pump is in its defrost mode, the counter is incremented, and if it is either in its normal mode or inactive mode, the counter is decremented. Once the counter reaches a critical count indicating that on more than half of the interrogations the heat pump is in its defrost mode, the heat pump will be shut down. If the heat pump is currently in its defrost cycle, however, shutdown will be delayed until the defrost cycle has been completed in order to avoid damage to the heat pump.

By utilizing a microcomputer to control the system, reprogramming of the limits for defrost cycling shutdown, outdoor ambient temperature disablement and reenablement, heat cycle length, and the like can be easily changed. For example, the constant value representing the maximum proportion of active heat cycle in which the heat pump will be permitted to operate in the defrost mode can be changed for a given heat pump unit. For a heat pump which has a longer defrost cycle, the programmed constant value will be longer. Furthermore, the heat cycle can be measured by the passage of absolute time, regardless of whether the heat pump is operating or not, or by measuring active heat pump operation. In either case, the preferred embodiment of the invention monitors the portion of the heat cycle time, regardless of how the heat cycle is determined, during which the heat pump is in its defrost mode.

In the disclosed embodiment, the control line from the heat pump thermostat is connected to the heat pump control input via the monitor/override module. If the microcomputer calls for heat pump enablement, the control line is passed through directly to the heat pump control input, but if the microcomputer calls for disablement of the heat pump, then this control line is interrupted. Accordingly, heat pump disablement is accomplished by simply interrupting the thermostat control line, thereby minimizing the extent to which internal connections must be made within the heat pump. The only other connection that is necessary is a control line from the heat pump defrost cycle circuitry back to the monitor/override module. This line is interrogated by the microcomputer to determine whether the heat pump is in its defrost mode and also to delay disablement of the heat pump until the defrost cycle has been completed.

The invention, in one form thereof, relates to a heating system having a supplemental heating source for supplying heat to an interior space and a heat pump for supplying heat to the interior space, wherein the heat pump has a heating mode of operation and a defrost mode of operation. A control system includes at least one thermostat having a sensor in the interior space for activating one or both of the supplemental heating source and the heat pump into operation. A heat pump control override system connected to the heat pump detects when the heat pump is in its defrost mode and disables the heat pump from operating in its heating mode when the heat pump is detected as operating in its defrost mode for a predetermined portion of a given cyclically recurring time interval.

In accordance with another form of the invention, the heating system includes a supplemental heating source for supplying heat to an interior space, a heat pump for supplying heat to the interior space and having a heating mode of operation and a defrost mode of operation, and a control system including at least one thermostat having a sensor in the interior space for activating one or both of the supplemental heating source and the heat pump into operation. A heat pump control override system connected to the heat pump detects when the heat pump is in its defrost mode and disables the heat pump from operating in its heating mode when the heat pump is detected as operating in its defrost mode for a predetermined portion of a given cyclically recurring time signal. The override system includes means for detecting the outside ambient temperature and disabling the heat pump when the detected temperature is below a predetermined level and prevents reenablement of the heat pump as long as the outside ambient is detected as being below the predetermined level.

In yet another form of the invention, the heating system comprises a supplemental heating source for supplying heat to an interior space and a heat pump for supplying heat to the interior space, wherein the heat pump has a heating mode of operation and a defrost mode of operation. A control system including at least one thermostat having a sensor in the interior space activates one or both of the supplemental heating source and the heat pump into operation. A heat pump control override system connected to the heat pump repeatedly interrogates the heat pump to detect whether the heat pump is in its heating mode or its defrost mode and registers the mode of the heat pump at the time of each interrogation. The override system disables the heat pump when the number of interrogations on which the mode of the heat pump is registered as being in its defrost mode exceeds a predetermined percentage of the total number of interrogations in a heating cycle. In a preferred form of the invention, the heat pump control override system comprises a microcomputer into which the various limits are programmed.

The invention, in yet another form thereof, relates to a method of controlling a heating system having a supplemental heat source and a heat pump for supplying heat to an interior space wherein the heating system includes a thermostat mechanism that activates the heat pump and/or supplemental heat source in response to ambient temperature sensed by the thermostat. The method comprises sensing when the heat pump is in a defrost cycle, calculating the portion of a cyclically recurring heating cycle during which the heat pump is in its defrost cycle, and disabling the heat pump when the defrost portion exceeds a predetermined percentage of a heating cycle.

It is an object of the present invention to provide a heating system employing both a heat pump and a source of supplemental heat wherein inefficient operation of the heat pump is avoided, such as during low outside ambient temperature conditions and when excessive defrosting of the heat pump is necessary.

A further object of the present invention is to provide a heat pump control system wherein no substantial modification of either the heat pump or supplemental heating source is required to implement the control system, and wherein the basic inherent functioning of the heat pump is unaltered.

BRIEF DESCRIPTION OF THE DRAWINGS

These and other objects and advantages of the present invention will be apparent from the detailed description of the preferred embodiment which follows, taken together with the accompanying drawings wherein:

FIG. 5 is a flow chart illustrating the programmed operation of the control system.

DETAILED DESCRIPTION

Figure 1:
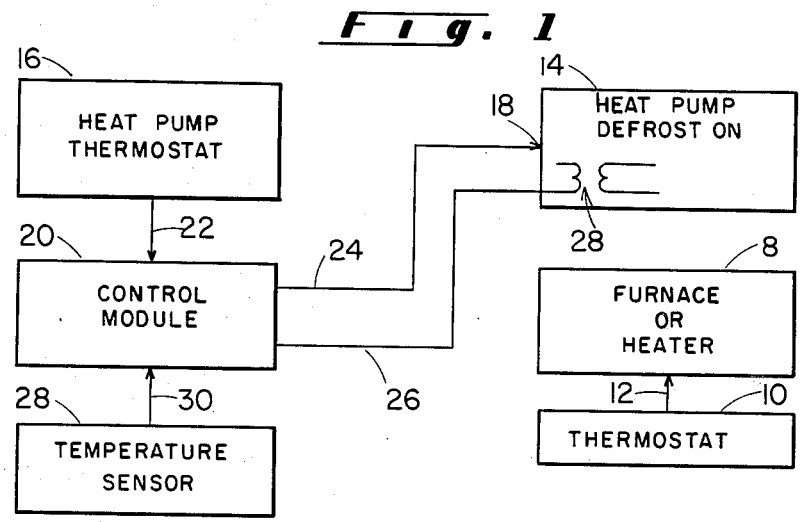
FIG. 1 is a block diagram of a heating system incorporating the control of the present invention.

With reference to FIG. 1, the heating system incorporating the control system of the present invention comprises a conventional furnace or heating system 8, such as a gas or oil furnace, a resistance heat furnace, or resistance heaters distributed throughout the building to be heated. Supplemental heating source 8 is controlled by a conventional thermostat 10 having a heat sensor located in the space to be heated, such as in a central area in the home or building. Alternatively, thermostat 10 may comprise a plurality of sensors distributed throughout the building and a central control which calls for heat depending on the inputs from the sensors. Furnace 8 and thermostat 10, which is connected to furnace 8 by thermostat lines 12, together form a supplemental heat source, which will be activated when heat pump 14 is unable to satisfy the requirements for heat, such as when the outside ambient temperature is too low or heat pump 14 is in its defrost cycle.

Heat pump 14 may be any one of a number of commercially available types and generally comprises a condenser located within the building and connected to the various rooms to be heated by forced air ducting, an evaporator located in thermal contact with the air outside the building, and a compressor for pumping the refrigerant in a recirculating fashion through the condenser and evaporator coils. Since heat pumps are well known, no further details of them will be discussed.

Heat pump thermostat 16, which is set slightly higher than supplemental heat thermostat 10, is connected to the control input 18 of heat pump 14 through control module 20 in a manner to be described below. Generally speaking, when temperature conditions permit and heat pump 14 is not defrost cycling more than a certain portion of the heating cycle, control module 20 connects the thermostat lines 22 from heat pump thermostat 16 directly to thermostat lines 24 connected to the control input 18 of heat pump 14. In this mode, when thermostat 16 calls for heat, and heat pump 14 is not in its defrost mode, heat pump 14 will be activated until the heat requirements have been satisfied, at which time the temperature sensed by thermostat 16 will rise sufficiently so that it will deactive heat pump 14. Heat pump 14 is connected to control module 20 by defrost control line 26, which is connected to the defrost control circuitry 28 within heat pump 14. During the defrost mode of heat pump 14, the outside evaporator coils are heated slightly to melt the frost which has accumulated thereon so that heat pump 14 is not able to supply heat to the building during its defrost cycle. If heat pump 14 is in its defrost cycle, and if the temperature within the building or interior space falls sufficiently, thermostat 10 will activate the supplemental heating source 8 in order to satisfy the lower temperature to which thermostat 10 is set. By way of example, thermostat 10 could be set to 66° F. and heat pump thermostat 16 set to 68° F. so that supplemental heat would not be provided unless heat pump 14 is enabled to satisfy the heat demand.

Temperature sensor 28 is located exteriorly of the building and is connected to control module 20 by line 30 in order to provide a signal on line 30 indicating the outside ambient temperature. Temperature sensor 28 may be a thermocouple or other suitable temperature sensing device. An indication of outside ambient temperature is provided so that control module 20 can shut down heat pump 14 when the outside ambient is too low, and can reenable heat pump 14 when the outside ambient has risen above a predetermined temperature or has risen by a predetermined amount above the outside ambient temperature at the time of heat pump shutdown. Preferably, control module 20 is located inside the heat pump outdoor unit.

Figure 2:
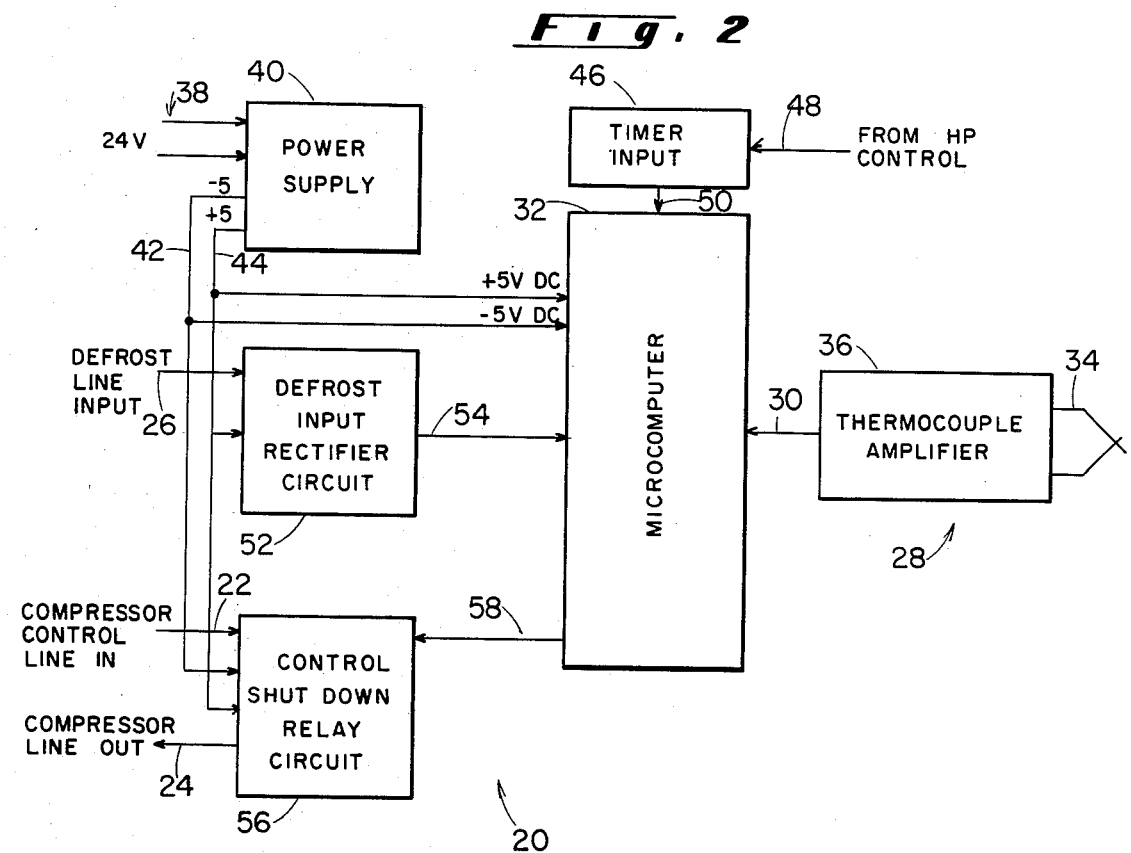
FIG. 2 is a block diagram showing a microcomputer implementation of the present invention and the basic input and output circuits connected thereto.

FIG. 2 illustrates the control module 20 in greater detail. At the heart of the control module 20 is microcomputer 2, which may be a Motorola MC 68705R3 microcomputer, for example. Outside temperature sensor 28 is connected to one of the input pins of microcomputer 32 and may comprise a type J thermocouple 34 connected to an AD594 Thermocouple Amplifier 36. Although thermocouple 34 and thermocouple amplifier 36 are shown as the outside temperature sensor, any other suitable temperature sensing device may be utilized. A 24 volt AC signal on lines 38 from heat pump 14 is connected to power supply 40, which produces on its outputs 42 and 44 the −5 and +5 logic levels which serve as the power supply for microcomputer 32 and other input and output circuits in the system.

Timer input circuit 48 is connected to the 60 hertz line 48 from heat pump 14 and supplies a low voltage input 50 to microcomputer 32 in order to drive the timer within microcomputer 32 for computation the various time limits required for the system operation. (As alternative to 48 the internal timing capability of microcomputer 36 can be used.) Defrost input rectifier 52 rectifies the low voltage defrost ON signal on line 26 from heat pump 14 and supplies an appropriate logic level on input 54 to pin 9 of microcomputer 32 when heat pump 14 is in its defrost cycle. Heat pump thermostat 16 is connected by line 22 through control shutdown relay circuit 56 to the control input 18 of heat pump 14 by relay output line 24. Relay circuit 56 is opened or closed by an appropriate signal on line 58 from microcomputer 32.

Figure 3:
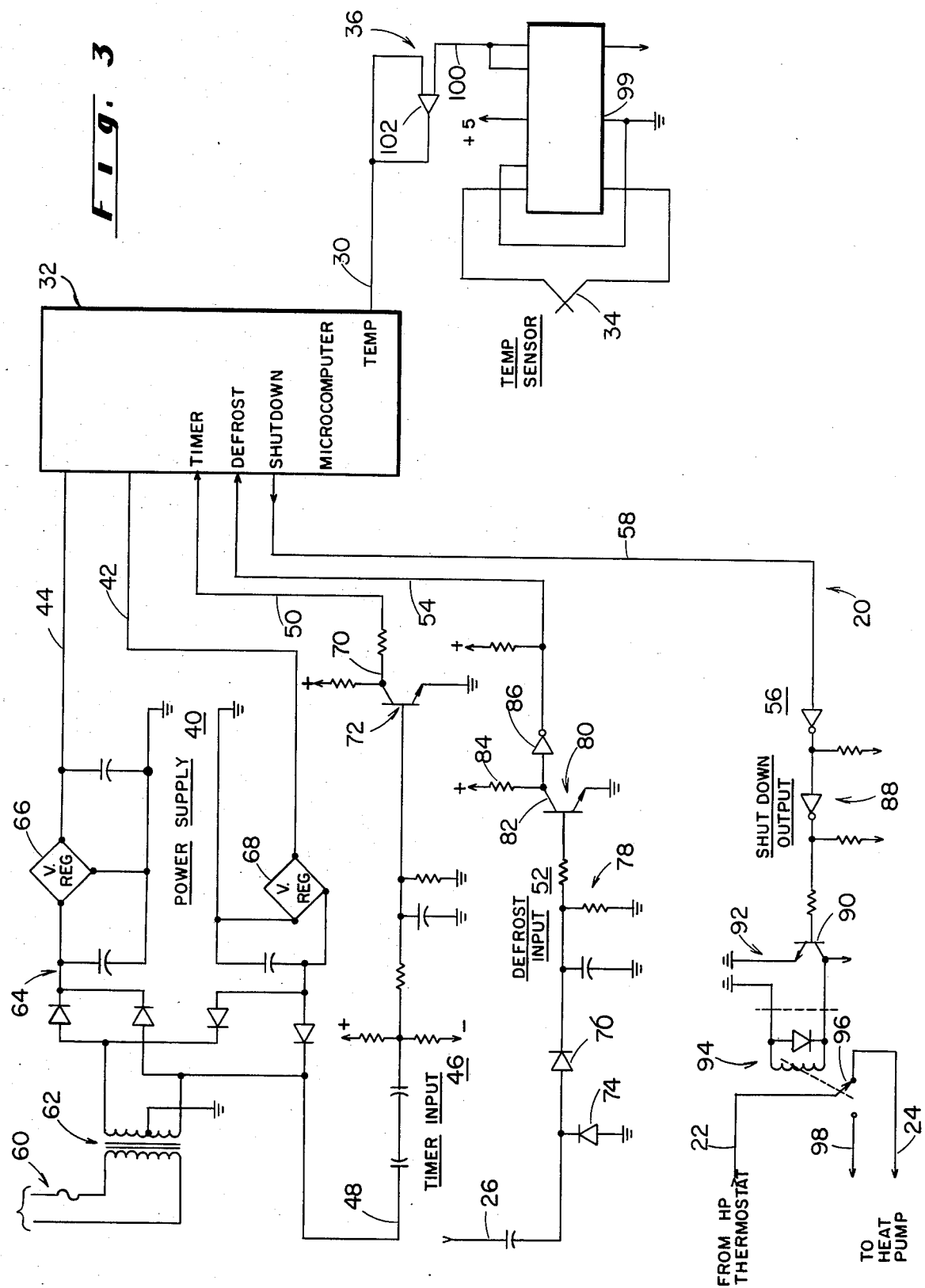
FIG. 3 is a circuit schematic of the circuit inputs and outputs to and from the microcomputer of FIG. 2.

FIG. 3 illustrates the control module 20 in even greater detail. Power supply 40 receives 110 volt AC current on lines 60, which is stepped down to 24 volts by transformer 62. Full wave rectifier 64, which includes voltage regulators 66 and 68, converts the AC current to the appropriate DC logic 1 and 0 levels on lines 44 and 42 connected to microcomputer 32.

Timer input circuit 46 converts the 24 volt AC current on line 48 to a pulse output on line 70 connected to the collector of transistor 72. The pulse signal on line 80 alternates between the logic 1 and logic 0 levels and is connected by line 50 to pin 8 of microcomputer chip 32.

The AC defrost signal on line 26 is half wave rectified by diodes 74 and 76 and connected through RC circuit 78 to the base of transistor 80. The collector 82 of transistor 80 is connected to logic 1 voltage through resistor 84 as is the output of inverter 86. Thus, when the AC defrost signal appears on line 26, the output 54 of inverter 86 will carry a logic 1 signal connected to pin 9 of microcomputer 32.

Pin 10 from microcomputer 32 is connected by line 58 to the input of heat pump shutdown output circuit 56. Data register C1 in microcomputer 32 goes high when heat pump shutdown is called for; this output is connected through a double inversion circuit 88 and is connected to the base 90 of transistor 92. The output of transistor 92 activates a reed relay 94 causing contact 96 to move from its normally closed position in contact with line 24 to its open position in contact with terminal 98. Terminal 98 may be connected to an indicator light (not shown), if desired. The input to moveable contact 96 is line 22 from heat pump thermostat 16. Thus, when relay 94 is activated, it disconnects thermostat line 22 from heat pump 14, thereby causing disablement of heat pump 14.

Temperature sensor 28 comprises a type J thermocouple 34 connected to an AD594 Thermocouple Amplifier 99, which produces a 10 millivolt output for each tenth of a millivolt input from thermocouple 34. The output 100 of amplifier 99 is connected through OP Amp 102 to pin 24 of microcomputer 32. OP Amp 102 converts the output of amplifier 99 to various voltages within a range of from 0 to +5 volts, which is connected to the analog to digital converter built into microcomputer 32. The software within microcomputer 32 converts the analog input to a digital value which is read as the ambient outdoor temperature. Thermocouple 34 is preferably located on or near the outdoor unit of heat pump 14.

Figure 4:
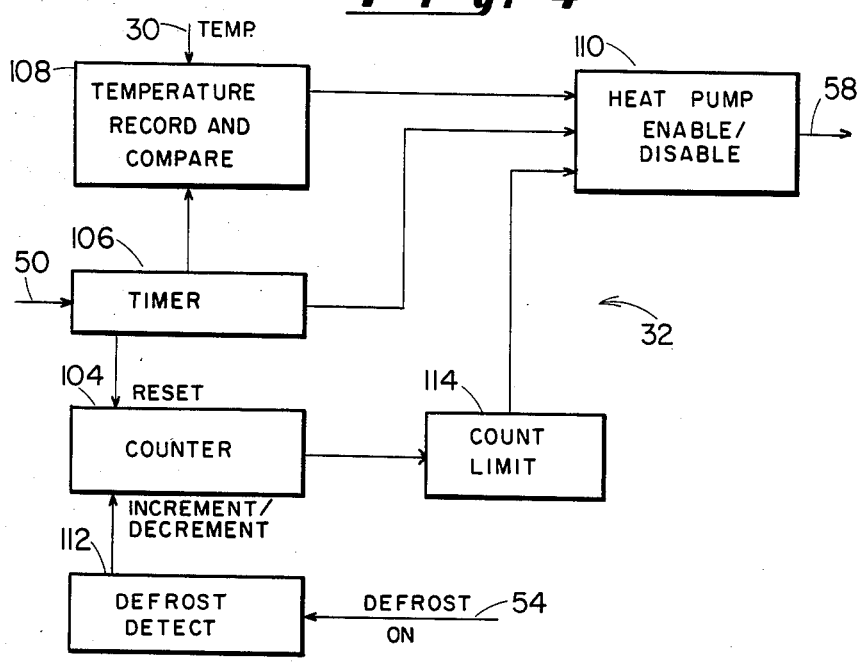
FIG. 4 is a block diagram of several of the functional blocks making up the microcomputer.

FIG. 4 illustrates in a diagrammatic fashion some of the functional blocks of microcomputer 32. Microcomputer 32 comprises a counter 104 that is reset by timer 106 driven by the 60 hertz AC input 50. The outdoor ambient temperature signal on line 30 is recorded in block 108 and compared with the sensed outdoor ambient temperature on the next interrogation of sensor 28 to determine whether the temperature has increased by a predetermined amount, for example, 5° F. Block 108 disables heat pump 14 when the outdoor ambient is below a certain level, for example, 15° F., and reenables heat pump 14 when the outdoor temperature is above a predetermined level, for example, 40° F. Block 108 also reenables heat pump 14 when the outdoor ambient has risen by a predetermined amount, for example, 5° F. The reason for requiring a certain increment of temperature increase to occur before reenablement of heat pump 20 is to avoid frequent on and off cycling. Block 108 is connected to heat pump enable/disable block 110.

Timer 106 is also connected to heat pump enable/disable block 110 and causes reenablement of heat pump 14 after a certain period of time, for example, 12 hours. Even though the temperature may not have risen 5° in this time period, it may have risen sufficiently, or the humidity conditions may have dropped sufficiently, to enable the heat pump to operate efficiently.

Counter 104 is incremented or decremented by a signal from defrost detect block 112, depending on whether heat pump 14 is in its defrost mode or not. Microcomputer 32 causes interrogation of the heat pump defrost circuitry on a periodic basis, and in the disclosed embodiment, counter 104 is incremented if heat pump 14 is defrosting and decremented if it is not defrosting. Of course, the counter could be decremented during defrost conditions and incremented if heat pump 14 is not defrosting, depending on the programming of microcomputer 32. When counter 104 reaches a predetermined limit as sensed by count limit detect block 114, thereby indicating that heat pump 14 has been in its defrost mode for a predetermined portion of the heating cycle, for example, 50% of the time, then enable/disable block 110 will disable heat pump 14 by interrupting heat pump thermostat control line 22, 26. Timer 106 establishes the heating cycle for counter 104 and will reset it when the heating cycle has been completed so that counter 104 will begin counting back up from zero. In the disclosed embodiment, microcomputer 32 programs counter 104 to have a minimum value of zero and will trigger shutdown of heat pump 14 when the counter within counter 104 reaches a count equal to 50% of the total number of interrogations of the system during one heating cycle. A typical heat cycle would be one hour long.

FIG. 5 illustrates the operation of microcomputer 32. Microcomputer 32 first goes through a power up initialization routine which resets all system counters including counter 104 (FIG. 4), sets data direction registers, and otherwise prepares for the monitor/control routine. A prescaled timer function then counts one minute and the sensed outdoor temperature is sampled and compared with the minimum outdoor temperature allowed for normal operation, in this case 15° F. If the outdoor temperature is below the minimum allowed, microcomputer 32 initiates shutdown control of the heat pump thereby activating relay 94 (FIG. 3). If the outdoor temperature is not below the minimum (15° F.), microcomputer 32 interrogates the mode of operation of heating pump 14. If heat pump 14 is not defrosting, then counter 104 is decremented and the procedure is repeated, beginning with the one minute timing sequence. If the heat pump is defrosting, however, as determined by the defrost control line 34, defrost counter 104 is incremented. Defrost counter 104 is then compared with the allowed limit, and if the count is not above the limit, the program returns to the one minute timing sequence. If counter 104 is above the defrost limit, however, microcomputer 32 initiates shutdown control of the heat pump system by activating relay 92.

When microcomputer 32 initiates shut down of the heat pump, it first monitors defrost control line 54, and shutdown is deferred until line 54 is at a logic 0, thereby indicating that the defrost cycle has been completed. Shutdown control circuit 56 is then activated and heat pump 14 is disabled. A prescaled countdown timer 106 (FIG. 4) is then initiated, and the outdoor temperature obtained and recorded. To this temperature is added a differential temperature constant, and the sum is stored in a RAM.

While heat pump 14 is in the shut down mode, the outdoor temperature is periodically checked and countdown timer 104 decremented at one minute intervals. The computer checks the outdoor temperature, compares this reading against the upper limit (40° F., for example) and if the outdoor temperature is above the predetermined limit, heat pump 14 is again enabled and the sequence begins with the one minute count. If the outdoor temperature is below the upper limit, the temperature is then checked against the recorded temperature, and if the temperature is greater than the temperature at shutdown by a predetermined amount (5° F., for example), heat pump 14 is again enabled. If the outdoor temperature is not 5° higher than the temperature at shutdown, timer 104 is decremented, a time period of one minute is counted, and the outdoor temperature is then checked again. This procedure is continued until either the countdown timer 104 times out, the outdoor temperature has risen more than 5° above the temperature at shutdown, or the outdoor temperature is above 40° F.

The process to enable normal heat pump operation begins with an interrogation of the outdoor temperature. Unless this temperature is greater than the minimum for normal operation, countdown timer 104 is reinitialized and shutdown is continued. If the outdoor temperature is above the predetermined upper level, shut down control circuit 56 (FIG. 3) is deactivated, reed relay coil 94 deenergized and the connection between thermostat lines 22 and 24 is reestablished. Microcomputer 32 then returns to the normal monitoring routine.

The following is a suitable program for microcomputer 32 to perform the operation described above:

```
A    ADATA    EQU     $000
A    BDATA    EQU     $001
A    CDATA    EQU     $002
A    ADDR     EQU     $004
A    BDDR     EQU     $005
A    CDDR     EQU     $006
A    TIMDAT   EQU     $008
A    TIMCTL   EQU     $009
A    TEMCTL   EQU     $00E
A    OUTEMP   EQU     $00F
A    EIGHTY   EQU     $80
     ORG      $10
*             VARIABLE TABLES
A    COUNT0   RMB     1
A    COUNT1   RMB     1
A    LOWLMT   RMB     1
A    UPLMT    RMB     1
A    DEFCNT   RMB     1
A    DEFLMT   RMB     1
A    TMPREF   RMB     1
A    TIME1    RMB     1
A    TIME2    RMB     1
*             PROGRAM ORIGIN
     ORG      $80
*             RESET INITIALIZATION
     INIT     RSP
A             LDA     #$00
A             STA     ADATA
A             STA     CDATA
A             STA     LOWLMT
A             STA     DEFCNT
A             STA     ADDR
A             LDA     #$01
A             STA     BDATA
A             STA     BDDR
A             LDA     #$02
A             STA     CDDR
A             LDA     #$8D
A             STA     UPLMT
A             LDA     #$1E
A             STA     DEFLMT
A             LDA     #$07
A             STA     COUNT1
A             LDA     #$FF
A             STA     COUNT0
A             STA     TIMDAT
A             LDA     #%00001111
A             STA     TIMCTL
              CLI
00AE          BRA     *
*             TIMER INTERRUPT
A    TIRQ     DEC     COUNT0
00CA          BNE     AGAIN
A             DEC     COUNT1
00CA          BNE     AGAIN
              SWI             GOTO
```

-continued

|  |  | COMMUNICATIO | |
|---|---|---|---|
| * | MONITOR ROUTINES | | |
| 00C0 | BRSET | 1,CDATA, MONITO | |
| 00D3 MONIT1 | BSR | TMPCHK | MONIT NORMAL OPER |
| 00C2 | BRA | WAYOUT | |
| 010D MONIT0 | BSR | MONIT2 | |
| A WAYOUT | LDA | #$FF | |
| A | STA | COUNT0 | |
| A | LDA | #$07 | |
| A | STA | COUNT1 | |
| A AGAIN | LDA | #$FF | |
| A | STA | TIMDAT | |
| A | LDA | #%00001111 | |
| A | STA | TIMCTL | |
|  | RTI | | |
| * | CHECK TEMP & DEFROST | | |
| 0135 TMPCHK | BSR | GETEMP | |
| A | CMP | LOWLMT | |
| 00F9 | BLS | SHUTDN | |
| 00E6 | BRSET | 0,CDATA,DEFCHK | |
| ** | BRANCH IF RESISTIVE HEAT ON | | |
| 00E6 | BRSET | 2,CDATA,DEFCHK | |
| A | TST | DEFCNT | |
| 00E5 | BEQ | RETURN | |
| A | DEC | DEFCNT | |
| RETURN | RTS | | |
| A DEFCHK | LDA | DEFCNT | CHECK DEFROST |
|  | INCA | | |
| A | CMP | DEFLMT | |
| 00F0 | BHI | CHKALM | |
| A | STA | DEFCNT | |
|  | RTS | | |
| 0135 CHKALM | BSR | GETEMP | |
| A | CMP | UPLMT | DEFROST IN WARM WEATHER? |
| 00F9 | BLS | SHUTDN | |
| A | BCLR | 0,BDATA | SEND ALARM |
|  | RTS | | |
| * | SHUTDOWN ROUTINE | | |
| 00F9 SHUTDN | BRSET | 0,CDATA,SHUTDN | |
| A | BSET | 1,CDATA | SHUT IT DOWN |
| 0135 | BSR | GETEMP | |
| A | ADD | #$19 | |
| A | STA | TMPREF | RESUME AT TEMP |
| A | LDA | #$B4 | |
| A | STA | TIME1 | INITIALIZE 12 HOUR TIMER |
| A | LDA | #$04 | |
| A | STA | TIME2 | |
|  | RTS | | |
| * | MONITOR SHUTDN | | |
| 0135 MONIT2 | BSR | GETEMP | |
| A | CMP | LOWLMT | |
| 011B | BLS | LOOP0 | |
| A | CMP | UPLMT | |
| 012E | BHS | RESUME | |
| A | CMP | TMPREF | |
| 012E | BHS | RESUME | |
| ***** | 12 HOUR SHUTDOWN TIMER | | |
| A LOOP0 | LDA | TIME1 | |
| LOOP1 | DECA | | |
| 0123 | BEQ | LOOP2 | |
| A | STA | TIME1 | |
|  | RTS | | |
| A LOOP2 | LDA | TIME2 | |
|  | DECA | | |
| 012E | BEQ | RESUME | |
| A | STA | TIME2 | |
| A | LDA | #$B4 | |
| 011D | BRA | LOOP1 | |
| ***** | RESUME NORMAL OPERATION | | |
| A RESUME | BCLR | 1,CDATA | |
| A | LDA | #$00 | |
| A | STA | DEFCNT | INITIALIZE DEFROS |
|  | RTS | | |
| ***** | GET OUTDOOR TEMP | | |
| A GETEMP | LDA | #$00 | |
| A | STA | TEMCTL | |
| 0139 TEMRDY | BRCLR | 7,TEMCTL,TEMRDY | |
| A | LDA | OUTEMP | |
|  | RTS | | |
| ***** | INTERRUPT TO COMMUNICATE | | |
| ***** | WITH BUILD MONITOR-SERIAL | | |
| POLL | RTI | | NO TALK THIS VERS |
| ***** | INTERRUPT VECTORS & MOR | | |
|  | ORG | $F38 | MOR |
| A | FCB | $8F | |
|  | ORG | $FF8 | INTERRUPT VECTORS |
| A | FDB | TIRQ | |
| A | FDB | POLL | |
| A | FDB | POLL | |
| A | FDB | INIT | |
|  |  | END | |

By using a microcomputer 32 for control of the system, the various limits and values can be easily programmed so that the system can be adapted for use in a variety of climatic areas and with a variety of different commercially available heat pumps. Although counter 104 has been programmed so that it increments when heat pump 14 is in the defrost mode, it could be programmed to decrement when this condition occurs, and increment when there is no heat pump defrost. Separate thermostats 16 and 10 for heat pump 14 and the supplemental heat source 8 have been shown, but a dual thermostat could also be used.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A heating system comprising:
   supplemental heating means for supplying heat to an interior space,
   heat pump means for supplying heat to the interior space, said heat pump means having a heating mode of operation and a defrost mode of operation,
   control means including at least one thermostat having a sensor in the interior space for activating at least one of said supplemental heating means and said heat pump means into operation, and
   heat pump control override means connected to said heat pump means for detecting when said heat pump means is in its defrost mode and disabling said heat pump means from operating in its heating mode when the heat pump means is detected as operating in its defrost mode for a predetermined portion of a given cyclically recurring time interval.

2. The heating system of claim 1 wherein said heat pump override means comprises: a counter, means for one of incrementing and decrementing said counter when said heat pump means is detected as being in its defrost mode and for the other of incrementing and decrementing said counter when said heat pump means is detected as not being in its defrost mode, and means for detecting said counter reaching a predetermined limit and disabling said heat pump means in response to said counter reaching said predetermined limit.

3. The heating system of claim 2 including means for adjusting the counter limit.

4. The heating system of claim 1 wherein said override means includes means for delaying the disablement of said heat pump means as long as said heat pump means is in its defrost mode and causing disablement of said heat pump means on termination of the defrost mode if disablement is otherwise called for.

5. The heating system of claim 1 wherein said override means includes means for detecting outside ambient temperature and disabling said heat pump means when the outside ambient temperature detected thereby falls below a predetermined shutdown level.

6. The heating system of claim 5 wherein said override means enables said heat pump means when the outside ambient temperature detected by said detecting means is equal to said predetermined shutdown level plus a predetermined temperature increment, wherein said predetermined temperature increment is greater than zero.

7. The heating system of claim 1 wherein said override means includes means for enabling said heat pump means when the outside ambient temperature detected by said detecting means is above a predetermined restore temperature level.

8. The heating system of claim 1 wherein said override means includes: means for measuring and recording the outside ambient temperature, and means for reenabling said heat pump means after disabling when one of the following conditions occurs:
(a) the measured outside ambient temperature exceeds a predetermined restore temperature level,
(b) the measured outside ambient temperature level is a predetermined amount higher than the outside ambient temperature when said heat pump means was last disabled.

9. The heating system of claim 1 wherein said override means includes: means for measuring and recording outside ambient temperature, timer means for measuring the time elapsed since the heat pump means was last disabled, and means for reenabling said heat pump means after disabling when one of the following conditions occurs:
(a) the measured outside ambient temperature exceeds a predetermined restore temperature level,
(b) the measured outside ambient temperature level is a predetermined amount higher than the outside ambient temperature when said heat pump means was last disabled,
(c) a predetermined amount of time has elapsed since the heat pump means was last disabled.

10. A heating system comprising:
supplemental heating means for supplying heat to an interior space,
heat pump means for supplying heat to the interior space, said heat pump means having a heating mode of operation and a defrost mode of operation,
control means including at least one thermostat having a sensor in the interior space for activating at least one of said supplemental heating means and said heat pump means into operation, and
heat pump control override means connected to said heat pump means for detecting when said heat pump means is in its defrost mode and disabling said heat pump means from operating in its heating mode when the heat pump means is detected as operating in its defrost mode for a predetermined portion of a given cyclically recurring time interval,
said override means including means for detecting the outside ambient temperature and disabling said heat pump means when the detected temperature is below a predetermined level, said means for detecting preventing reenablement of said heat pump means as long as the outside ambient temperature is detected as being below said predetermined level.

11. The heating system of claim 10 wherein said thermostat controls the activation of said heat pump means; said heat pump override means comprises a relay means including an input to which said thermostat is connected, output connected to a control input of said heat pump means, and a relay control input; and said override means enables said heat pump means by causing said relay means to connect said thermostat through to said heat pump control input and disables said heat pump means by causing said relay means to disconnect said thermostat from said heat pump means control input.

12. The heating system of claim 11 wherein said heat pump override means comprises: a counter, means for one of incrementing and decrementing said counter when said heat pump means is detected as being in its defrost mode and for the other of incrementing and decrementing said counter when said heat pump means is detected as not being in its defrost mode, and means for detecting said counter reaching a predetermined limit and disabling said heat pump means in response to said counter reaching said predetermined limit.

13. The heating system of claim 10 wherein said override means includes means for measuring and recording outside ambient temperature and means for reenabling said heat pump means after disabling when the measured outside temperature is a predetermined amount higher than the outside ambient temperature at the time said heat pump means was last disabled.

14. A heating system comprising:
supplemental heating means for supplying heat to an interior space,
heat pump means for supplying heat to the interior space, said heat pump means having a heating mode of operation and a defrost mode of operation,
control means including at least one thermostat having a sensor in the interior space for activating at least one of said supplemental heating means and said heat pump means into operation, and
heat pump control override means connected to said heat pump means for repeatedly interrogating said heat pump means to detect whether said heat pump means is in its heating mode or its defrost mode and registering the mode of said heat pump means at the time of each interrogation and disabling said heat pump means when the number of interrogations on which the mode of said heat pump means is registered as being in its defrost mode exceeds a predetermined percentage of total interrogations in a given cyclically recurring heating cycle.

15. The heating system of claim 14 wherein said override means includes means for detecting outside ambient temperature and disabling said heat pump means when the outside ambient temperature detected thereby falls below a predetermined shutdown level.

16. The heating system of claim 14 wherein said override means enables said heat pump means when the outside ambient temperature detected by said detecting means is equal to said predetermined shutdown level plus a predetermined temperature increment, wherein said predetermined temperature increment is greater than zero.

17. The heating system of claim 14 wherein said override means includes means for enabling said heat pump means when the outside ambient temperature detected by said detecting means is above a predetermined restore temperature level.

18. The heating system of claim 14 wherein said override means includes: means for measuring and recording the outside ambient temperature, and means for reenabling said heat pump means after disabling when one of the following conditions occurs:
   (a) the measured outside ambient temperature exceeds a predetermined restore temperature level,
   (b) the measured outside ambient temperature level is a predetermined amount higher than the outside ambient temperature when said heat pump means was last disabled.

19. The heating system of claim 14 wherein said override means includes: means for measuring and recording outside ambient temperature, timer means for measuring the time elapsed since the heat pump means was last disabled, and means for reenabling said heat pump means after disabling when one of the following conditions occurs:
   (a) the measured outside ambient temperature exceeds a predetermined restore temperature level,
   (b) the measured outside ambient temperature level is a predetermined amount higher than the outside ambient temperature when said heat pump means was last disabled,
   (c) a predetermined amount of time has elapsed since the heat pump means was last disabled.

20. The heating system of claim 14 wherein said override means for disabling said heat pump means comprises means for disconnecting said thermostat from said heat pump means.

21. A heating system comprising:
supplemental heating means for supplying heat to an interior space, said supplemental heating means including a supplemental heat thermostat means for sensing the ambient temperature in the interior space and activating into operation said supplemental heating means in response to the sensed temperature falling below a first predetermined limit,
heat pump means for supplying heat to the interior space, said heat pump means including a heat pump thermostat for sensing the ambient temperature of the interior space and being connected to a control means on said heat pump means, said control means activating into operation said heat pump means in response to the ambient temperature sensed by the heat pump means thermostat falling below a second predetermined limit, said first limit being lower than said second limit,
said heat pump means having a heating mode and a defrost mode, and
heat pump monitor and override means for detecting when the heat pump means is in its defrost mode and disabling said heat pump means when the heat pump means is detected as being in its defrost mode for a predetermined portion of a given cyclically recurring heating cycle.

22. The heating system of claim 21 wherein said heat pump thermostat means is connected to said heat pump control means through said monitor override means, and said monitor override means disables said heat pump means by disconnecting said heat pump thermostat from said heat pump control means.

23. A method of controlling a heating system having a supplemental heat source and a heat pump for supplying heat to an interior space, wherein the heating system includes a thermostat mechanism that activates the heat pump and supplemental heat source in response to ambient temperature sensed by the thermostat, said method comprising: sensing when the heat pump is in a defrost cycle, calculating a value representing the portion of its cyclically recurring heating cycle during which the heat pump is in its defrost cycle, and disabling the heat pump when the defrost portion value exceeds a predetermined value representative of a given percentage of a given cyclically recurring heating cycle.

24. The method of claim 23 wherein the heat pump is disabled by interrupting a connection between a thermostat and a thermostat control input of the heat pump.

25. The method of claim 23 including the step of sensing the outside ambient temperature and disabling the heat pump when the sensed temperature is below a predetermined level.

26. The method of claim 25 including the step of reenabling the heat pump when the sensed outdoor ambient temperature is above a predetermined level.

27. The method of claim 23 including the steps of: sensing and recording the outside ambient temperature at the time the heat pump is disabled and reenabling the heat pump when the outside temperature sensed is higher by a predetermined amount than the recorded temperature when the heat pump was last disabled.

28. The method of claim 23 including measuring the amount of time elapsed since the last disablement of the heat pump and reenabling the heat pump if the measured elapsed time exceeds a predetermined amount.

* * * * *